United States Patent
Maeda et al.

(10) Patent No.: US 9,746,687 B2
(45) Date of Patent: Aug. 29, 2017

(54) ILLUMINATION APPARATUS AND BIOMETRIC AUTHENTICATION APPARATUS

(71) Applicant: FUJITSU LIMITED, Kawasaki-shi, Kanagawa (JP)

(72) Inventors: Satoshi Maeda, Atsugi (JP); Yukihiro Abiko, Kawasaki (JP); Soichi Hama, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 14/967,511

(22) Filed: Dec. 14, 2015

(65) Prior Publication Data

US 2016/0209668 A1 Jul. 21, 2016

(30) Foreign Application Priority Data

Jan. 16, 2015 (JP) .................................. 2015-006987

(51) Int. Cl.
| | |
|---|---|
| *G02B 27/42* | (2006.01) |
| *G06K 9/00* | (2006.01) |
| *G06K 9/20* | (2006.01) |
| *G02B 5/18* | (2006.01) |
| *G02B 27/09* | (2006.01) |

(52) U.S. Cl.
CPC ......... *G02B 27/425* (2013.01); *G02B 5/1866* (2013.01); *G02B 27/0927* (2013.01); *G06K 9/00033* (2013.01); *G06K 9/00885* (2013.01); *G06K 9/2036* (2013.01)

(58) Field of Classification Search
CPC . G03F 7/70158; G02B 27/425; G02B 5/1861; G02B 27/0037; G02B 27/4244
See application file for complete search history.

(56) References Cited

U.S. PATENT DOCUMENTS

| | | |
|---|---|---|
| 6,965,685 B1 | 11/2005 | Smith |
| 2008/0247167 A1 | 10/2008 | Matsubara et al. |

(Continued)

FOREIGN PATENT DOCUMENTS

| | | |
|---|---|---|
| EP | 1109163 A2 | 6/2001 |
| EP | 2056238 A1 | 5/2009 |
| EP | 3001349 A2 | 3/2016 |

(Continued)

OTHER PUBLICATIONS

Coleman, Christopher et al., "Applications of diffractive optics with LED sources", Diffractive Optics and Micro-Optics, Jan. 1, 2000, pp. DThA4-1/291-DThA4-1/293, XP055263643, Washington, D.C..

(Continued)

*Primary Examiner* — Marcus Taningco
(74) *Attorney, Agent, or Firm* — Fujitsu Patent Center

(57) ABSTRACT

An illumination apparatus is disclosed, which includes a light source configured to generate light for an illumination area to be illuminated, and a diffraction grating element provided between the illumination area and the light source, and including a plurality of diffraction gratings arranged in a two dimensional array. A distribution of grating intervals of the diffraction gratings in the diffraction grating element has a characteristic such that a center region, along a predetermined line in a plane of the two dimensional array, has a greater grating interval than an end region.

18 Claims, 20 Drawing Sheets

(56) References Cited

U.S. PATENT DOCUMENTS

2009/0028396 A1    1/2009   Kishima
2013/0335560 A1   12/2013   Higashiura et al.

FOREIGN PATENT DOCUMENTS

| JP | 2005-527874 | 9/2005 |
|----|-------------|--------|
| JP | 2009-031903 | 2/2009 |
| JP | 2013-130981 | 7/2013 |
| WO | 03/025836   | 3/2003 |

OTHER PUBLICATIONS

Cornelissen, Hugo J. et al., "Diffraction gratings for Lighting applications", Proceedings of SPIE, vol. 8835, Sep. 30, 2013, p. 88350I-1-88350I-8, XP055203884.

Extended European Search Report dated Jun. 7, 2016 for corresponding European Patent Application No. 15198635.3, 10 pages.

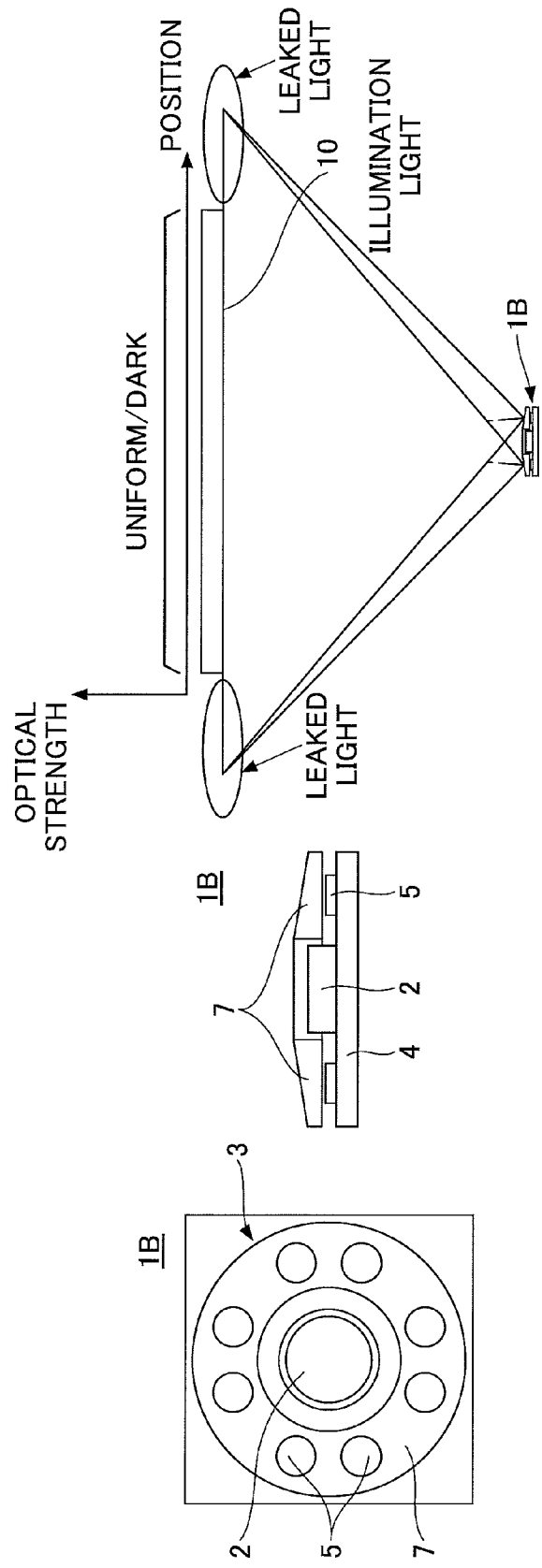

ILLUMINATION APPARATUS AND BIOMETRIC AUTHENTICATION APPARATUS

CROSS-REFERENCE TO RELATED APPLICATIONS

This present application is based upon and claims the benefit of priority of the prior Japanese Patent Application No. 2015-006987, filed on Jan. 16, 2015, the entire contents of which are incorporated herein by reference.

FIELD

This disclosure is related to an illumination apparatus and a biometric authentication apparatus.

BACKGROUND

Recently, a biometric authentication technique has been developed for authenticating users of a system in a non-contact manner based on biometric images which represent biometric information such as a venous pattern of hands or fingers, patterns of fingerprints or palms. A biometric authentication apparatus using the biometric authentication technique checks input biometric information of the users against pre-registered biometric information of registered users. The biometric authentication apparatus regards the user whose biometric information corresponds to the registered biometric information as a registered user who has authorized rights, and permits the user to use the system. The biometric authentication apparatus may be incorporated in the system, for example, or externally connected to the system.

The biometric authentication apparatus is used in various fields, such as management of logging on of PCs (Personal Computers), authentication at ATMs (Automated Teller Machine) of banks, management of entrance and exit at offices, etc.

In order to check the users with high accuracy with the biometric authentication apparatus, it is desired that contractual features of the biometric information are clearly captured in the biometric image. Therefore, a biometric authentication sensor for capturing the biometric information to generate the biometric image may include, in addition to an imaging optical system with which a subject including the biometric information such as a hand is captured by an imaging lens and an imaging element such as a CCD (Charge Coupled Device), an illumination optical system for illuminating the subject.

A technique for the biometric authentication sensor including the illumination optical system and the imaging optical system is proposed (Patent Documents 1, 2 and 3, for example).

[Patent Document 1] Japanese Laid-open Patent Publication No. 2009-31903

[Patent Document 2] Japanese Laid-open Patent Publication No. 2013-130981

[Patent Document 3] Japanese National Publication of International Patent Application No. 2005-527874

According to the conventional methods, it is difficult to uniformly illuminate the subject such as a hand with the illumination optical system.

SUMMARY

According to one aspect of the disclosure, an illumination apparatus is provided, which includes:

a light source configured to generate light for an illumination area to be illuminated; and a diffraction grating element provided between the illumination area and the light source, and including a plurality of diffraction gratings arranged in a two dimensional array, wherein a distribution of grating intervals of the diffraction gratings in the diffraction grating element has a characteristic such that a center region, along a predetermined line in a plane of the two dimensional array, has a greater grating interval than an end region.

The object and advantages of the embodiment will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 2A through 2C are diagrams explaining a second example of the sensor for a biometric authentication apparatus.

DESCRIPTION OF EMBODIMENTS

In the following, embodiments are described in detail with reference to appended drawings.

Figure 1C:
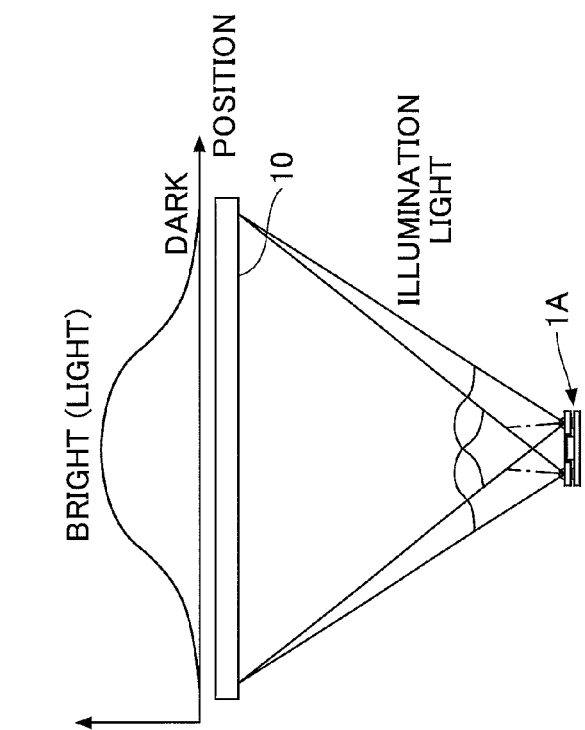
FIGS. 1A through 1C are diagrams explaining a first example of a sensor for a biometric authentication apparatus.
Figure 1B:
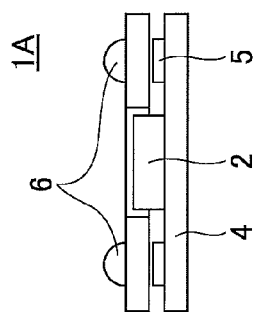
Figure 1A:
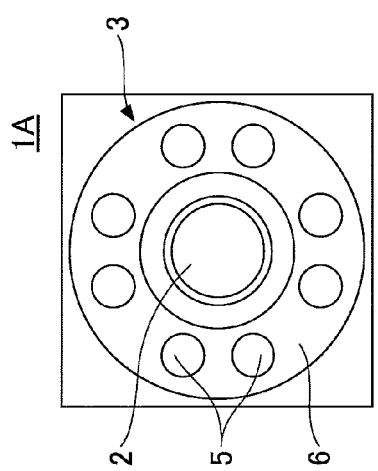

FIGS. 1A through 1C are diagrams explaining a first example of a sensor for a biometric authentication apparatus (referred to as "a biometric authentication sensor", hereinafter). FIG. 1A is a top view of the biometric authentication sensor, FIG. 1B is a schematic side view of the biometric authentication sensor, and FIG. 1C is a schematic diagram illustrating illumination light of the biometric authentication sensor and an illumination distribution. The biometric authentication sensor 1A includes an imaging optical system 2 such as a camera, and an illumination optical system 3. The illumination optical system 3 includes a plurality of LEDs (Light-Emitting Diodes) 5 (eight LEDs, in this example), which are provided on a substrate 4, and a lens array 6. In this example, as illustrated in FIG. 1A, the LEDs 5 are disposed in a ring manner around an outer side of the imaging optical system 2, and the lens array 6 is provided in a ring manner such that the lens array 6 is opposed to the LEDs 5.

As illustrated in FIG. 1C, the lens array 6 causes the illumination light from the LEDs 5 to be spread, and the spread illumination light reaches an illumination area 10. As illustrated at its top in FIG. 1C, strength of the illumination light (arbitrary unit) is varied according to positions (arbitrary unit) on the illumination area 10. In this example, the optical strength in a center portion of the illumination area 10 is higher than that in other portions of the illumination area 10. A distribution of light and dark regions generated in the illumination area 10 is determined according to an arrangement of the LEDs 5 and the characteristics of the lens array 6. It is difficult to make the optical strength of the illumination light uniform.

FIGS. 2A through 2C are diagrams explaining a second example of a sensor for an illumination apparatus. FIG. 2A is a top view of the biometric authentication sensor, FIG. 2B is a schematic side view of the biometric authentication sensor, and FIG. 2C is a schematic diagram illustrating illumination light of the biometric authentication sensor and an illumination distribution. In FIGS. 2A through 2C, the same elements as illustrated in FIGS. 1A through 1C are given the same reference numbers, and an explanation thereof is emitted. The biometric authentication sensor 1B illustrated in FIGS. 2A through 2C differs from the biometric authentication sensor 1A in FIGS. 1A through 1C in that a diffuser light guide plate 7 is provided, instead of the lens array 6, in a ring form such that the diffuser light guide plate 7 is opposed to the LEDs 5. As illustrated in FIG. 2C, the diffuser light guide plate 7 causes the illumination light from the LEDs 5 to be diffused, and the diffused illumination light reaches an illumination area 10. As illustrated at its top in FIG. 2C, the strength of the illumination light (arbitrary unit) becomes uniform, regardless of the positions (arbitrary unit) on the illumination area 10. However, the diffused illumination light reaches a region other than the illumination area 10. As illustrated by ellipse regions in FIG. 2C, at the outside of the illumination area 10, loss due to leakage of the light increases, which causes the strength of the illumination light to be reduced. In order to prevent the reduction in the illumination light, solutions such as increasing the number of the LEDs 5, and using LEDs with higher output power may be contemplated; however, increasing the number of the LEDs 5 leads to upsizing of the illumination optical system 3. Further, using the LEDs with higher output power also leads to upsizing of the illumination optical system 3, because, in general, the LEDs with higher output power are relatively large in size for the increased heat.

Therefore, embodiments described hereinafter are directed to increasing, with the illumination apparatus, uniformity in a distribution of the strength of the illumination light over the illumination area. Further, the embodiments described hereinafter are directed to increasing the accuracy of the authentication with the biometric authentication apparatus.

Figure 3:
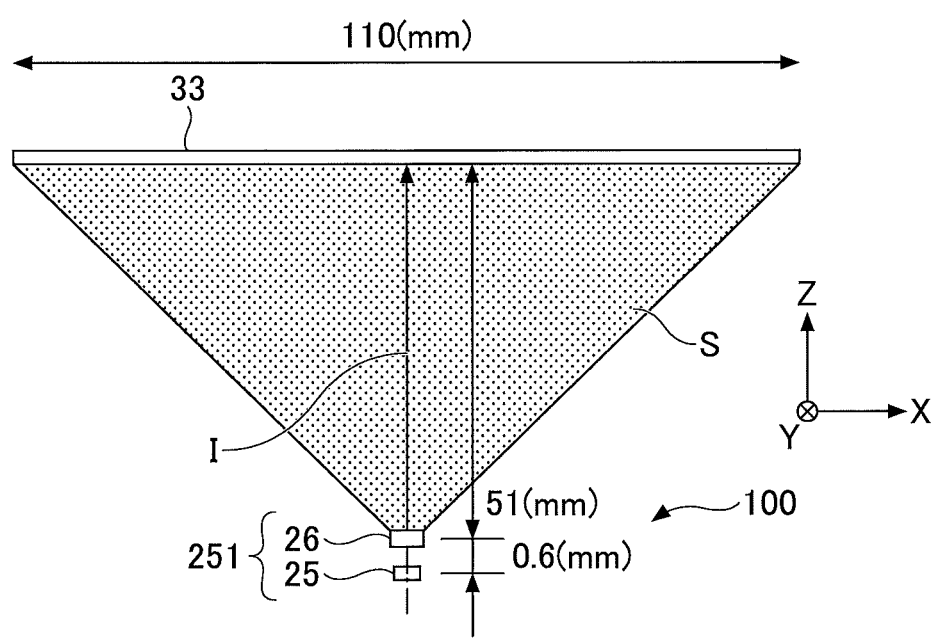
FIG. 3 is a diagram schematically illustrating an example of a cross-section of the illumination apparatus according to a first embodiment.

FIG. 3 is a diagram schematically illustrating an example of a cross-section of the illumination apparatus according to a first embodiment. In FIG. 3, an example of the illumination apparatus according to the first embodiment is indicated by a reference number "100". In FIG. 3, X, Y and Z directions, which are perpendicular to each other, are defined. Further, in FIG. 3, spread light from a diffraction grating element 26 toward an illumination area 33 is schematically illustrated with a hatching region S. It is noted that, in the first embodiment, it is assumed that the optical axis of a light source 25, the optical axis of the diffraction grating element 26, and a main light beam emitted from the center of the diffraction grating element 26 are the same.

In FIG. 3, the illumination area 33 is schematically illustrated in a section-view.

An outside shape and a size of the illumination area 33 are arbitrary. Typically, the outside shape and the size of the illumination area 33 are determined according to an outside shape and a size of a portion of a living body to be authenticated. For example, in the case of the non-contact type authentication, the illumination area 33 may be an assumed area in which the portion of the living body is to be located at the time of the authentication. On the other hand, in the case of the contact type authentication, the illumination area 33 may be a portion (a platen formed of a transparent material such as glass, for example) that comes into contact with the portion of the living body. It is noted that the size of the illumination area 33 is substantially greater than the size of a diffraction region of the diffraction grating element 26 and the size of a light emitting surface of the light source 25. In the following, as an example, it is assumed that the illumination area 33 is a planer area with a rectangular shape and parallel with an X-Y plane.

The illumination apparatus 100 includes the light source 25 and the diffraction grating element 26.

The light source 25 emits the light to the illumination area 33. The optical axis of the light source 25 is illustrated by a reference "I". In the example illustrated in FIG. 3, the optical axis I is perpendicular to the illumination area 33 (i.e., parallel with Z direction). Preferably, the light source 25 is not a light source that emits light with high directivity and parallel light flux characteristics, such as laser light, but a light source that emits spread light. The light source 25 may be an LED (a near-infrared LED, a white LED, for example), for example.

The diffraction grating element 26 is provided between the illumination area 33 and the light source 25. The diffraction grating element 26 includes a unified body in which a plurality of diffraction gratings are arranged in a two dimensional array (see FIG. 4). In the example illustrated in FIG. 3, the plane of the two dimensional array is parallel with X-Y plane. The center of the plane of the two dimensional array of the diffraction grating element 26 (also referred to as "a center of the diffraction grating element 26", hereinafter) is disposed on the optical axis of the light source 25.

It is noted that in the example illustrated in FIG. 3, as an example, the illumination area 33 has the rectangular shape of 110 mm×110 mm, and an interval between the light source 25 and the diffraction grating element 26 is 6 mm. Further, an interval between the illumination area 33 and the diffraction grating element 26 is 51 mm in Z direction.

Figure 4:
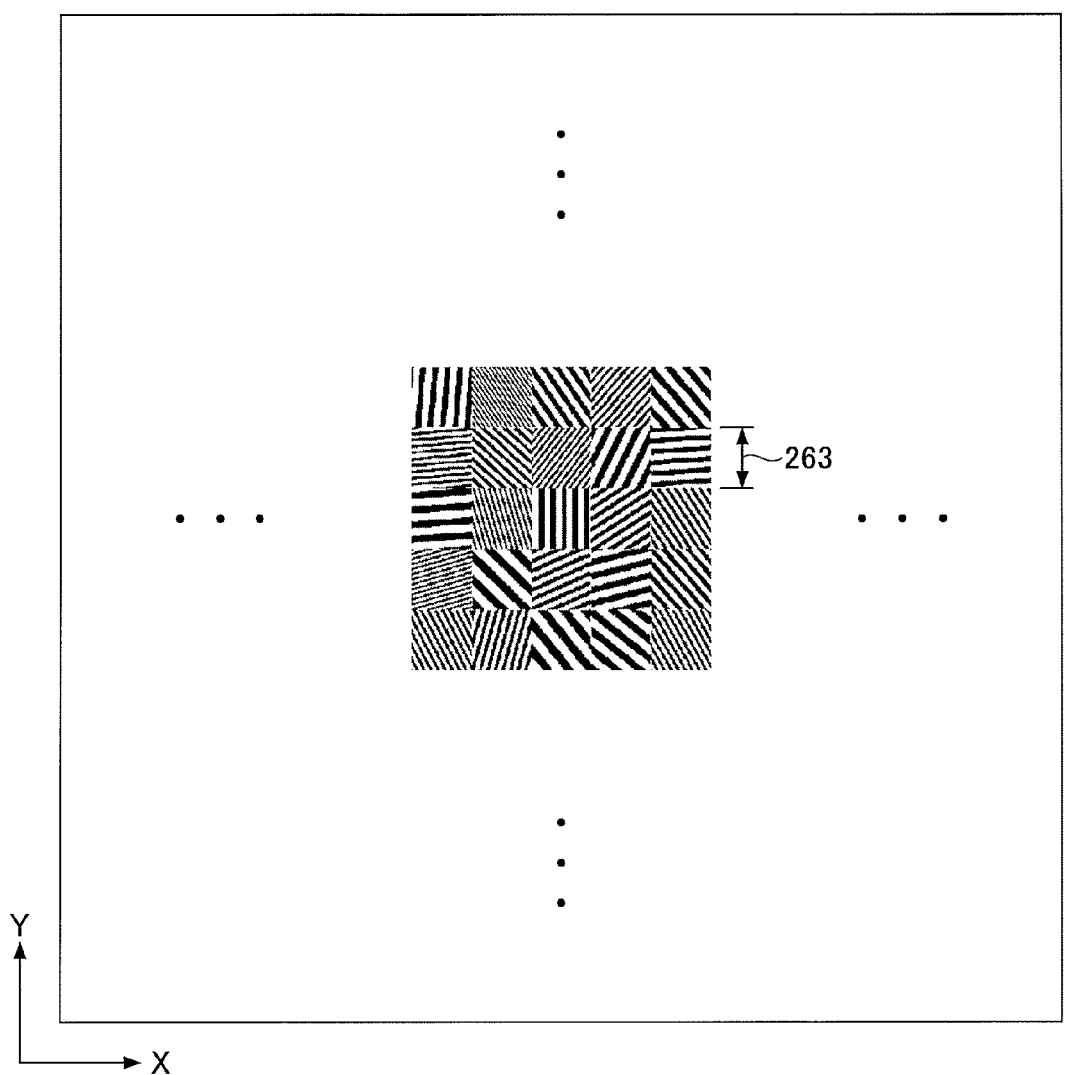
FIG. 4 is a diagram illustrating an example of a plurality of diffraction gratings arranged in a two dimensional array.

FIG. 4 is a diagram illustrating an example of the diffraction gratings of the diffraction grating element 26. It is noted that, in FIG. 4, the illustration of the diffraction gratings other than those in the center portion of the diffraction grating element 26 are omitted. In this example, the diffraction grating element 26 includes a plurality of the diffraction gratings (also referred to as "cells", hereinafter) 263 arranged in a matrix form. Grating intervals (pitches) and rotation directions of the respective cells 263 may be different. The outside shape of the cells 263 is not limited to rectangular, the arrangement of the cells 263 is not limited to the matrix form, and the number of the cells 263 is also arbitrary. In the following, the number of the cells 263 along one side of the diffraction grating element 26 is also referred to as "a pixel number PIX". Further, a particular cell 263 is identified with the pixel numbers PIX in X and Y directions, and the pixel numbers PIX in X and Y directions are determined using a left and lower cell 263 in FIG. 4 whose pixel numbers PIX in X and Y directions are (1,1).

Figure 5:
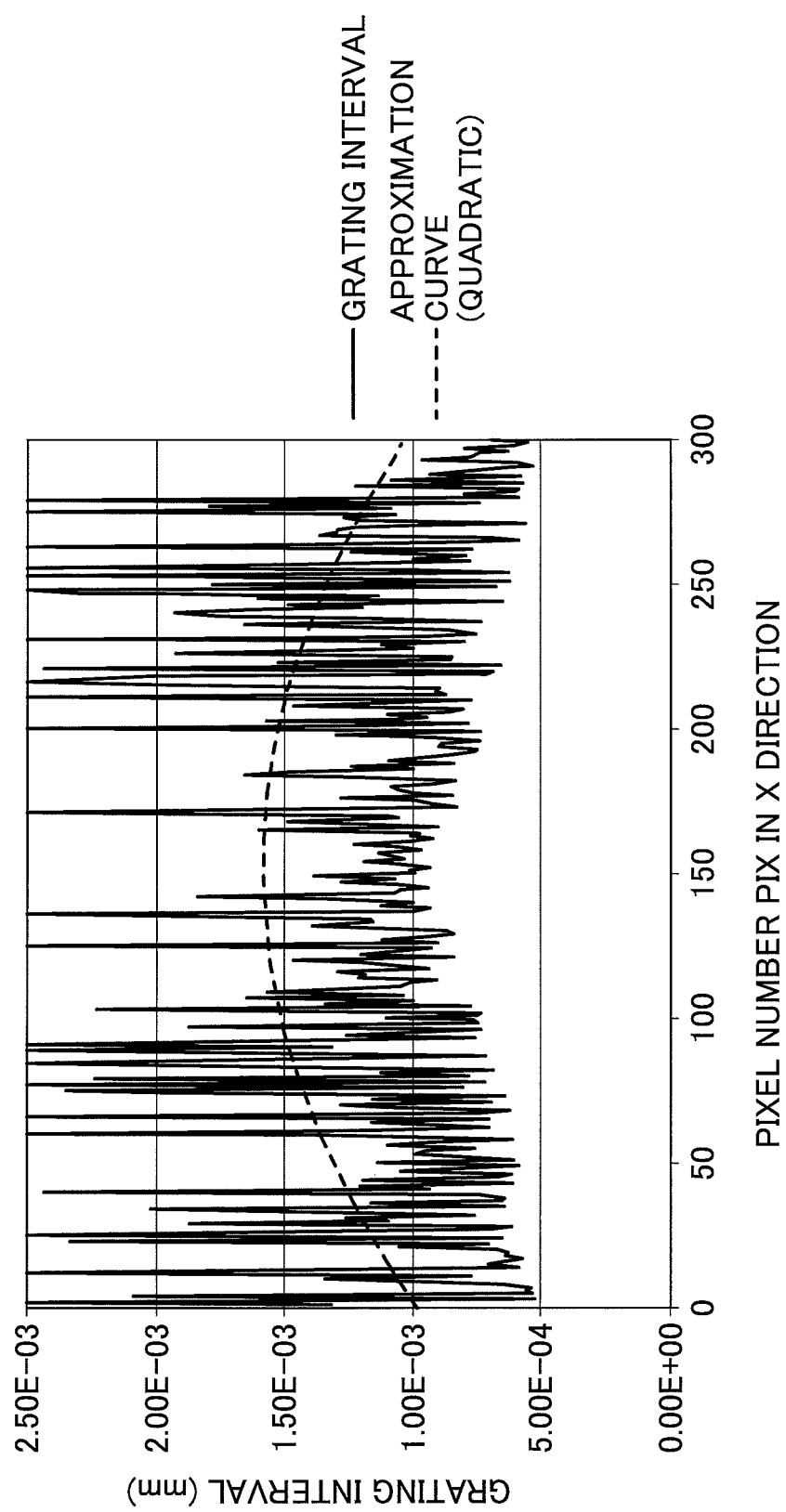
FIG. 5 is a diagram illustrating an example of a distribution characteristic of grating intervals of a diffraction grating element 26.

FIG. 5 is a diagram for illustrating an example of a distribution characteristic of grating intervals of the diffraction grating element 26. FIG. 5 illustrates the distribution characteristic of grating intervals of a plurality of diffraction gratings (300 diffraction gratings, in this example) along X direction. For example, the distribution characteristic of grating intervals along a line (an example of a predetermined line) of X direction through the center of the diffraction grating element 26 is illustrated in FIG. 5.

In the example illustrated in FIG. 5, as an example, the characteristic obtained from the diffraction grating element 26 whose dimensions are as follows. The diffraction grating element 26 has a rectangular shape of 3 mm×3 mm, the pixel number PIX of the diffraction grating element 26 is 300, and the cells 263 each have a rectangular shape of 0.01 mm×0.01 mm. In FIG. 5, a line connecting the grating intervals of the respective cells 263 along X direction is indicated with a solid line. Further, in FIG. 5, an approximation curve of a polynomial (quadratic) for the respective values (plots) of the grating intervals of the respective cells 263 along X direction is indicated with a broken line. It is noted that the order of the polynomial for the approximation curve is arbitrary.

As illustrated in FIG. 5, according to the first embodiment, the distribution of the grating intervals along X direction has a characteristic such that the grating interval in the center region is greater than that in the end region. For example, as illustrated in FIG. 5, the grating intervals at the pixel number PIX in X direction between 125 and 175 are substantially greater than the grating intervals at the pixel number PIX in X direction between 1 and 50 and between 250 and 300. It is noted that, in the example illustrated in FIG. 5, the distribution characteristic of the grating intervals is symmetrical with respect to the point at the pixel number PIX of 150 in X direction; however, the distribution characteristic of the grating intervals may not be symmetrical. Further, the approximation curve has its peak at the pixel number PIX of 150 in X direction (i.e., at the center of the diffraction grating element 26 in X direction); however, the pixel number PIX (i.e., the position of the diffraction grating element 26 in X direction) at which the approximation curve has its peak may be slightly shifted from the precise center of the diffraction grating element 26 as long as the pixel number PIX at which the approximation curve has its peak corresponds to the center of the diffraction grating element 26.

It is noted that the distribution characteristic illustrated in FIG. 5 is a characteristic along the line in X direction that passes through the center of the diffraction grating element 26. However, the diffraction grating element 26 may have such a characteristic as illustrated in FIG. 5 along a line in X direction through an arbitrary position other than the center, or along a line in X direction through an arbitrary position in a particular range of Y direction. Further, the diffraction grating element 26 may have such a characteristic as illustrated in FIG. 5 along a line in Y direction. Similarly, in this case, the diffraction grating element 26 may have such a characteristic as illustrated in FIG. 5 along a line in Y direction through the center of the diffraction grating element 26. Alternatively, the diffraction grating element 26 may have such a characteristic as illustrated in FIG. 5 along a line in Y direction through an arbitrary position other than the center, or along a line in Y direction through an arbitrary position in a particular range of X direction. Alternatively, the diffraction grating element 26 may have such a characteristic as illustrated in FIG. 5 along a line in another direction (i.e., another direction that has components in X and Y directions, respectively) through the center of the diffraction grating element 26. In these cases, the phrase "having such a characteristic as illustrated in FIG. 5" does not necessarily mean having strictly the same characteristic, and the difference between the grating interval in the center region and the grating interval in the end region may be greater or smaller than that illustrated in FIG. 5. In other words, the polynomial for the approximation curve along one line may have different coefficients from those of the polynomial along another line. In the following, as an example, it is assumed that the diffraction grating element 26 has such a characteristic as illustrated in FIG. 5 along an arbitrary line (an example of a predetermined line) through the center of the diffraction grating element 26.

Figure 6:
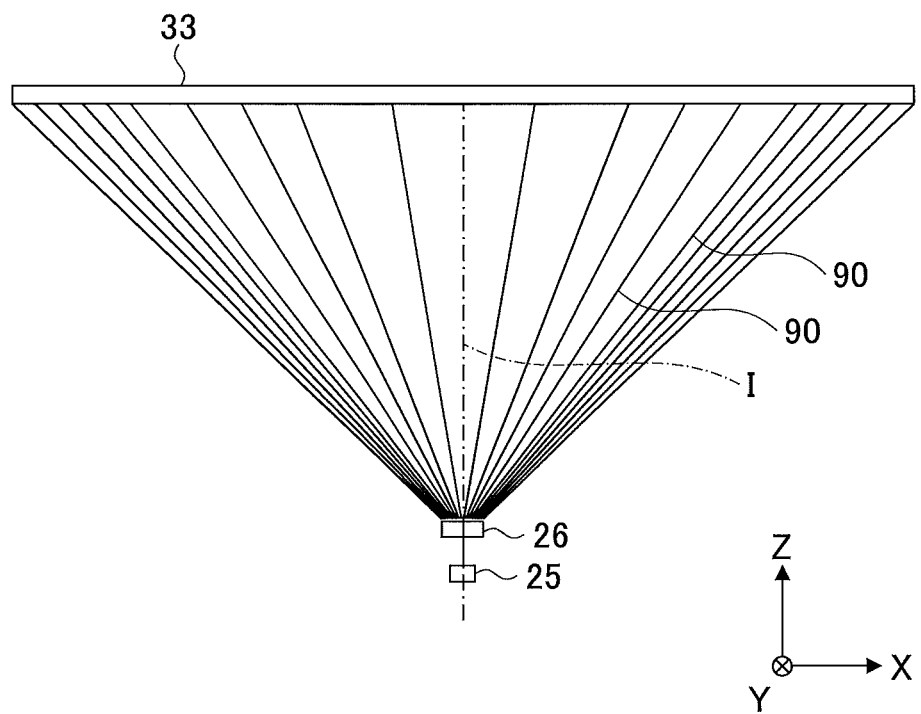
FIG. 6 is a diagram schematically illustrating a distribution of optical strength of n-th diffracted light directed to an illumination area 33.

FIG. 6 is a diagram schematically illustrating a distribution of optical strength of n-th diffracted light directed to the illumination area 33. Lines 90 represent the optical strength of the n-th diffracted light such that the wider the interval between the lines 90 becomes, the lower the optical strength of n-th diffracted light is (i.e., the narrower the interval between the lines 90 becomes, the greater the optical strength of the n-th diffracted light is).

Here, an general characteristic of the diffraction can be expressed with the following approximation formula.

$$n\lambda/d = \sin\theta i + \sin\theta o$$

n: diffraction order
λ: wavelength
d: grating interval
θi: incident angle
θo: diffraction angle This formula means that the greater the grating interval d becomes, the smaller the diffraction angle becomes (i.e., the smaller the grating interval d becomes, the greater the diffraction angle becomes).

Figure 7:
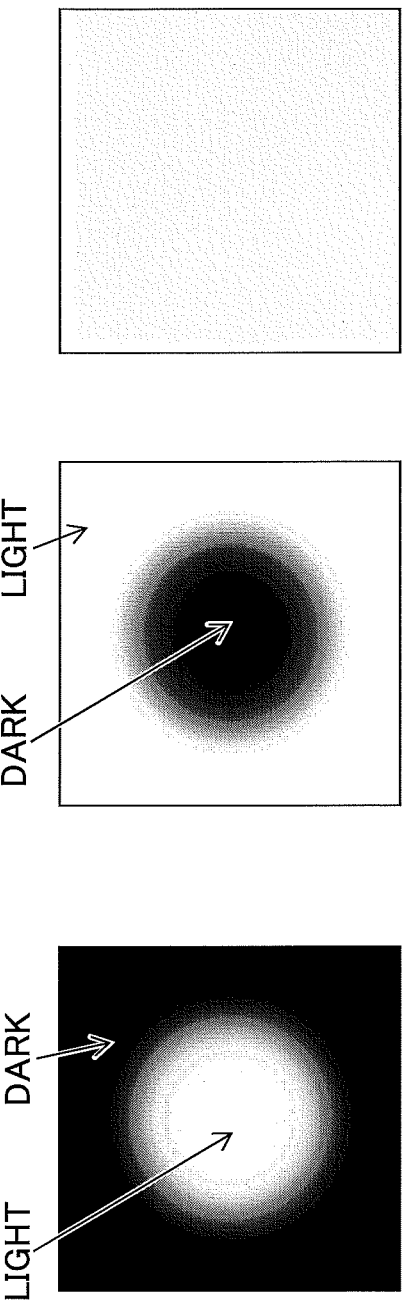
FIGS. 7A through 7C are diagrams illustrating a distribution of optical strength in the illumination area 33.

FIGS. 7A through 7C are diagrams illustrating a distribution of optical strength in the illumination area 33. FIG. 7A illustrates a distribution of optical strength of 0th transmission light, FIG. 7B illustrates a distribution of optical strength of n-th order diffracted light, and FIG. 7C illustrates a distribution of optical strength of a combination of the 0th transmission light and the n-th order diffracted light. In FIG. 7, it is meant that the more black the grayscale becomes, the lower (i.e., the darker) the optical strength becomes.

Here, in general, the greater the grating interval d becomes, the lower the optical strength of the diffracted light becomes. Thus, it is known that, in the case where the grating interval is wide, the optical strength of the $0^{th}$ transmit light is greater while the optical strength of the diffracted light is lower, and in the case where the grating interval is narrow, the optical strength of the $0^{th}$ transmit light is lower while the optical strength of the diffracted light is greater.

As illustrated in FIG. 7A, the $0^{th}$ transmission light is inevitably generated in the diffraction grating element 26, and thus the distribution of the optical strength of the illumination light over the illumination area 33 is affected by the distribution of the optical strength of the illumination light by the $0^{th}$ transmit light. In particular, the center region of the diffraction grating element 26 has higher optical strength of the light incident from the light source 25 than other regions (Gaussian distribution, for example), and thus has the distribution of the optical strength substantially affected by the distribution of the optical strength of the illumination light by the $0^{th}$ transmit light from the cells 263 in the center region of the diffraction grating element 26. According to the first embodiment, as illustrated in FIG. 5, since the grating interval in the center region in X direction is greater than that in the end region, the optical strength of the light from the cells 263 in the center region in X direction to the illumination area 33 is such that the optical strength of the $0^{th}$ transmission light is great and the optical strength of the diffracted light is small. Thus, the distribution of the optical strength by the $0^{th}$ transmission light has its peak at the center of the illumination area 33 (i.e., the center of the light source 25), viewed from Z direction, as illustrated in FIG. 7A. Further, as illustrated in FIG. 7B, the optical strength of the n-th diffracted light that illuminates the center region of the illumination area 33 is lower than that of the n-th diffracted light that illuminates the end region of the illumination area 33. Specifically, the distribution of the optical strength by the n-th diffracted light has its minimum at the center of the illumination area 33 (i.e., the center of the light source 25), viewed from Z direction, as illustrated in FIG. 7B.

Therefore, according to the first embodiment, as illustrated in FIG. 7C, it becomes possible to increase uniformity in the distribution of the optical strength when the $0^{th}$ transmission light and the n-th diffracted light are combined.

Figure 8:
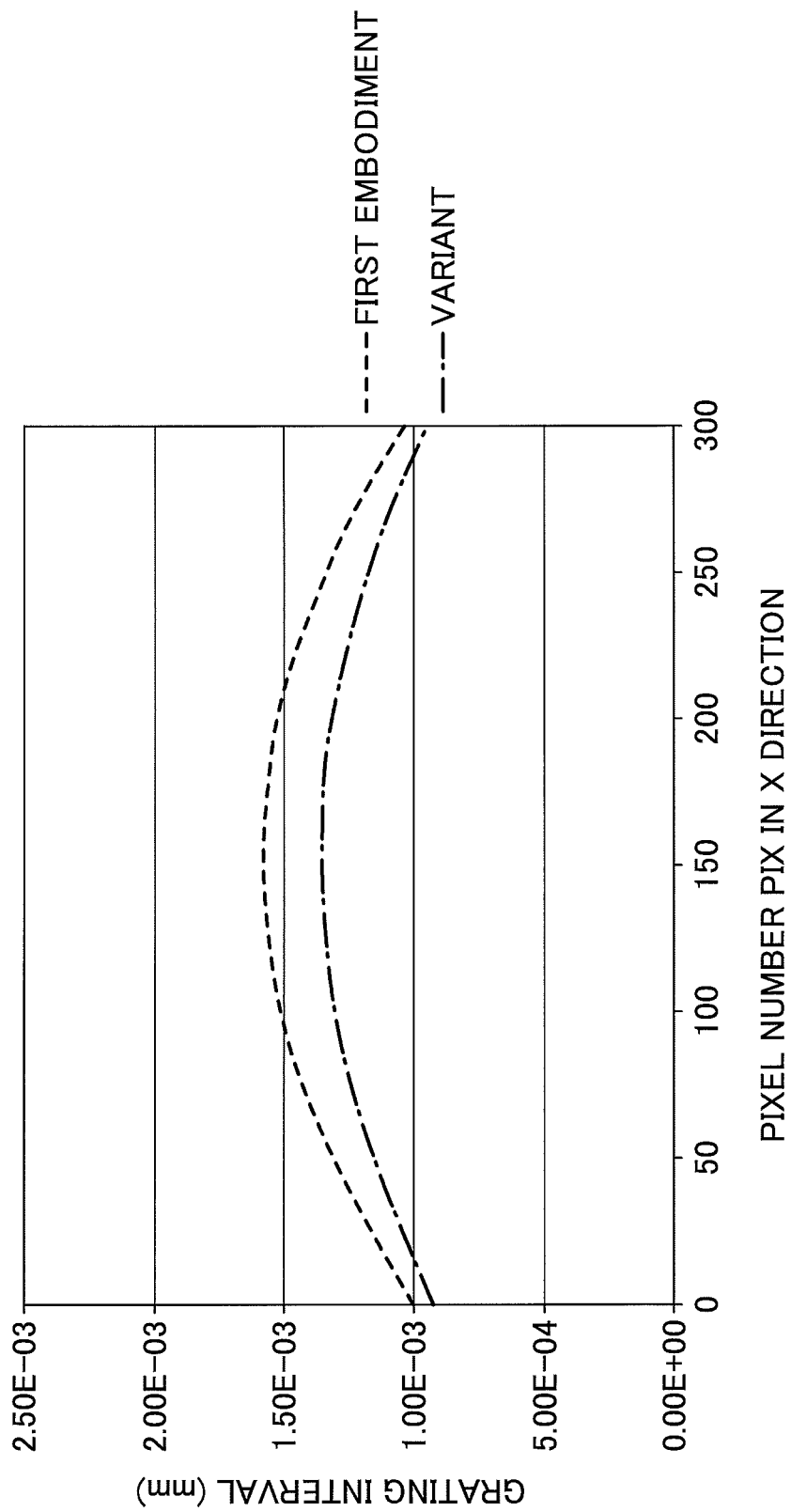
FIG. 8 is a diagram illustrating a distribution of grating intervals along X direction of a diffraction grating element 26'.
Figure 9:
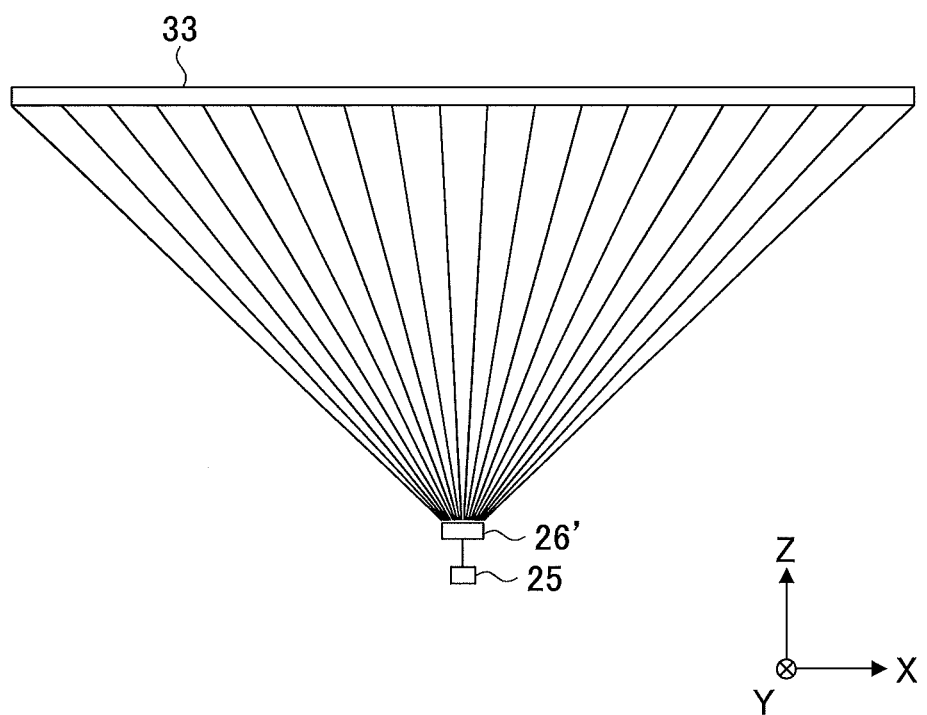
FIG. 9 is a diagram schematically illustrating a distribution of optical strength of n-th diffracted light directed to an illumination area 33 by the diffraction grating element 26'.

Next, with reference to FIG. 8 and FIG. 9, a variant for the first embodiment described above is described.

FIG. 8 is a diagram illustrating a distribution of grating intervals along X direction of a diffraction grating element 26'. It is noted that the distribution characteristic is a characteristic (an approximation curve of a quadratic) along the line in X direction through the center of the diffraction grating element 26'. However, as the case with the first embodiment, the diffraction grating element 26' may have such a characteristic as illustrated in FIG. 8 along another line. In FIG. 8, a broken line indicates the case of the first embodiment described above, and an alternate long and short dash line indicates the case of the variant. FIG. 9 is a diagram schematically illustrating a distribution of the optical strength of the n-th diffracted light directed to the illumination area 33 by the diffraction grating element 26'. In FIG. 9, as is the case with FIG. 6 in the first embodiment described above, lines 90 represent the optical strength of the n-th diffracted light such that the wider the interval between the lines 90 becomes, the lower the optical strength of n-th diffracted light is (i.e., the narrower the interval between the lines 90 becomes, the greater the optical strength of the n-th diffracted light is).

According to the variant, the grating intervals of the diffraction grating element 26' are set such that the distribution of the optical strength of the n-th diffracted light over the illumination area 33 becomes uniform, as schematically illustrated in FIG. 9. In FIG. 9, a state in which the grating intervals between the respective lines 90 are uniform is illustrated. Specifically, in the variant, as illustrated in FIG. 8, as is the case with the first embodiment described above, the distribution characteristic of the grating intervals along the line in X direction has a characteristic such that the grating interval in the center region of the diffraction grating element 26' is greater than that in the end region of the diffraction grating element 26'. However, according to the variant, as illustrated in FIG. 8, the grating intervals are narrower than those according to the first embodiment described above. This tendency is noticeable in the center region of the diffraction grating element 26' in X direction, in particular.

According to the variant, the distribution characteristic of the grating intervals along X direction is such that the grating interval in the center region of the diffraction grating element 26' is greater than that in the end region of the diffraction grating element 26', but smaller than that in the first embodiment described above, which can increase uniformity in the distribution of the optical strength of the n-th diffracted light over the illumination area 33. In other words, according to the first embodiment described above, the distribution characteristic of the grating intervals along X direction is such that the grating intervals are greater than those according to the variant and the grating interval in the center region of the diffraction grating element 26 is greater than that in the end region of the diffraction grating element 26. As a result of this, according to the first embodiment, it becomes possible to increase uniformity in the distribution of the optical strength when the $0^{th}$ transmission light and the n-th diffracted light are combined.

It is noted that, according to the first embodiment (including the variant thereof), the distribution of the grating intervals of the diffraction grating element 26 has its peak at the position corresponding to the center of the diffraction grating element 26 in X direction, as illustrated in FIG. 5 and FIG. 8. Here, as described above, the position of the diffraction grating element 26 in X direction at which the distribution has its peak may be slightly shifted from the concise center of the diffraction grating element 26. For example, when the center of the diffraction grating element 26 is slightly shifted from the center of the illumination area 33 (i.e., from the optical axis of the imaging optical system 72) in X direction, the position of the diffraction grating element 26 in X direction at which the distribution has its peak may be shifted from the concise center of the diffraction grating element 26 toward the center of the illumination area 33. In this case, the grating intervals of the diffraction grating element 26 may be set such that such an approximation curve as illustrated in FIG. 5, for example, has its peak value at a position corresponding to the center of the illumination area 33. This holds the same for a case where the center of the diffraction grating element 26 is slightly shifted from the center of the illumination area 33 in another direction (other than X direction). In any case, the grating intervals of the diffraction grating element 26 may be set such that an approximation curve representing the distribution of the grating intervals along the corresponding direction has its peak value at a position corresponding to the center of the illumination area (the center of the illumination area 33 is equal to the optical axis of the imaging optical system 72).

Next, with reference to FIG. 10 through FIG. 13, an illumination apparatus according to a second embodiment is described.

Figure 10:
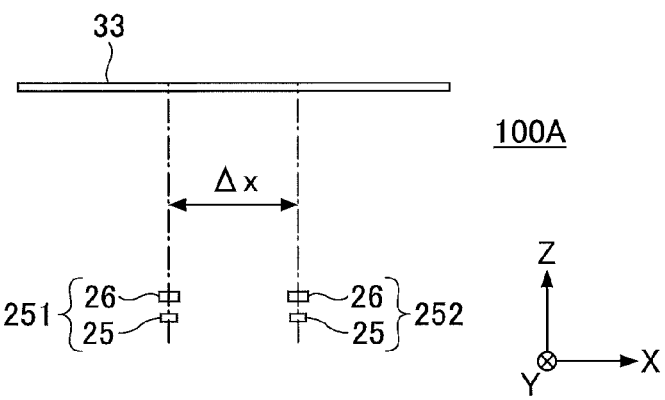
FIG. 10 is a diagram schematically illustrating an example of a cross-section of an illumination apparatus according to a second embodiment.

FIG. 10 is a diagram schematically illustrating an example of a cross-section of the illumination apparatus according to the second embodiment. In FIG. 10, an example of the illumination apparatus according to the second embodiment is indicated by a reference number "100A".

The illumination apparatus 100A differs from the illumination apparatus 100 according to the first embodiment described above in that two sets of the light source 25 and the diffraction grating element 26, each of which is described above in the first embodiment, are arranged in X direction.

A first optical set 251 includes a light source 25 and a diffraction grating element 26, and a second optical set 252 includes a light source 25 and a diffraction grating element 26. The configurations of the light source 25 and diffraction grating element 26 may be the same as those according to the first embodiment described above.

According to the illumination apparatus 100A illustrated in FIG. 10, since two first optical sets (i.e., the first optical set 251 and the second optical set 252) are provided, it becomes possible to increase, in a desired manner, the uniformity in the distribution of the optical strength of the illumination light over the illumination area 33, even if the illumination area 33 is relatively large. For example, by adjusting an interval Δx in X direction between the first optical set 251 and the second optical set 252, it becomes possible to increase, in a desired manner, the uniformity in the distribution of the optical strength when the $0^{th}$ transmission light and the n-th diffracted light are combined (see FIG. 11 and FIG. 12).

It is noted that, according to the illumination apparatus 100A illustrated in FIG. 10, two optical sets (i.e., the first optical set 251 and the second optical set 252) are provided; however, three or more optical sets may be provided. Further, according to the illumination apparatus 100A illustrated in FIG. 10, two optical sets (i.e., the first optical set 251 and the second optical set 252) are arranged in X direction; however, these optical sets may be arranged in Y direction or a combined direction of X and Y directions. Further, three or more optical sets may be arranged in a pattern other than a straight line pattern.

Figure 11A:
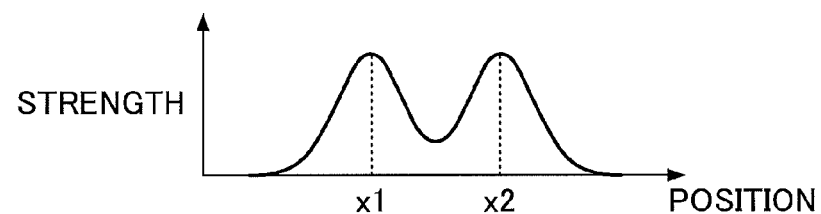
FIGS. 11A through 11C are diagrams illustrating an example of a distribution characteristic of the optical strength in the illumination area 33 obtained by an illumination apparatus 100A.
Figure 11B:
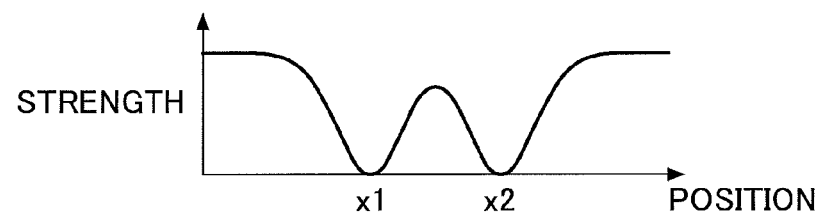
Figure 11C:
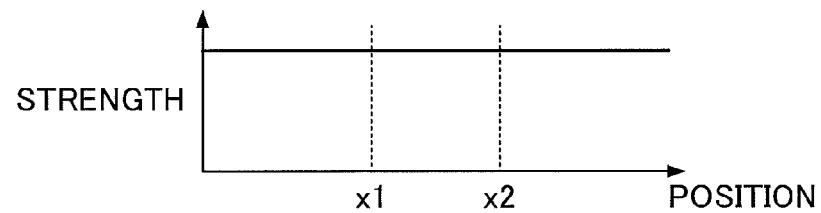

FIGS. 11A through 11C are diagrams illustrating an example of a distribution characteristic of the optical strength in the illumination area 33 obtained by an illumination apparatus 100A. In FIGS. 11A through 11C, a lateral axis represents a position in the illumination area 33 in X direction, and a vertical axis represents strength. It is noted that, in FIGS. 11A through 11C, a position "x1" corresponds to the position of the first optical set 251 in X direction, and a position "x2" corresponds to the position of the second optical set 252. FIG. 11A illustrates the distribution of the optical strength of the $0^{th}$ transmission light, FIG. 11B illustrates the distribution of the optical strength of the n-th diffracted light, and FIG. 11C illustrates the distribution of the optical strength when the $0^{th}$ transmission light and the n-th diffracted light are combined. In the example illustrated in FIGS. 11A through 11C, a case where the interval Δx in X direction between the first optical set 251 and the second optical set 252 is relatively great. In the example illustrated in FIGS. 11A through 11C, the interval Δx in X direction between the first optical set 251 and the second optical set 252 is set such that the distribution of the optical strength, when the $0^{th}$ transmission light and the n-th diffracted light are combined, is uniform as illustrated in FIG. 11C.

Figure 12A:
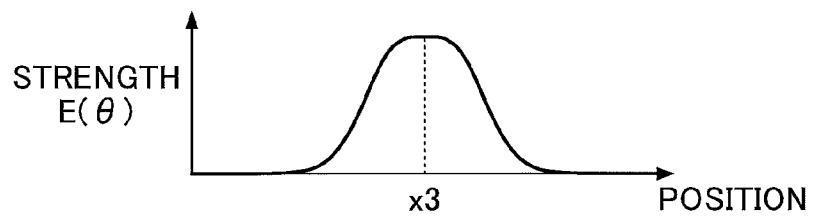
FIGS. 12A through 12C are diagrams illustrating another example of a distribution characteristic of the optical strength in the illumination area 33 obtained by the illumination apparatus 100A.
Figure 12B:
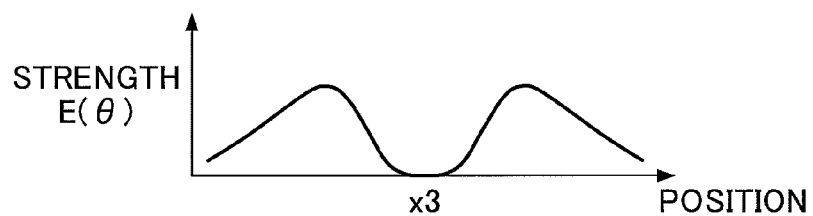
Figure 12C:
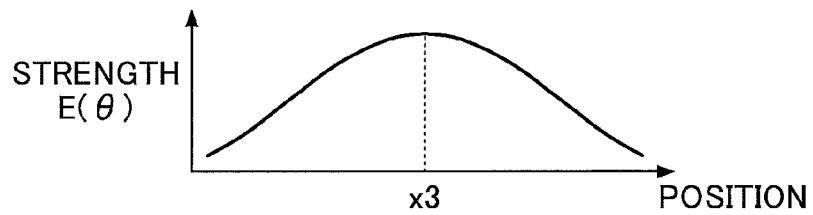
Figure 13:
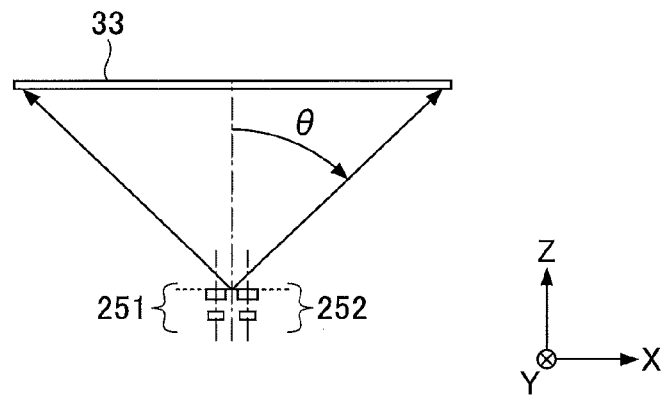
FIG. 13 is a diagram explaining the illumination apparatus 100A when the characteristics in FIG. 12 are obtained.

FIGS. 12A through 12C are diagrams illustrating another example of a distribution characteristic of the optical strength in the illumination area 33 obtained by the illumination apparatus 100A. In FIGS. 12A through 12C, a lateral axis represents a position in the illumination area 33 in X direction, and a vertical axis represents a strength. It is noted that a position "x3" corresponds to a midpoint in X direction between the first optical set 251 and the second optical set 252. FIG. 12A illustrates the distribution of the optical strength of the $0^{th}$ transmission light, FIG. 12B illustrates the distribution of the optical strength of the n-th diffracted light, and FIG. 12C illustrates the distribution of the optical strength when the $0^{th}$ transmission light and the n-th diffracted light are combined. In the example illustrated in FIGS. 12A through 12C, a case where the interval Δx in X direction between the first optical set 251 and the second optical set 252 is relatively small, as illustrated in FIG. 13. In the example illustrated in FIGS. 12A through 12C, the interval Δx in X direction between the first optical set 251 and the second optical set 252 is set such that the distribution of the optical strength, when the $0^{th}$ transmission light and the n-th diffracted light are combined, is spherical as illustrated in FIG. 12C. Such a spherical strength distribution is expressed as follows, for example.

$$E(\theta) = E0 \times (\cos \theta)^2$$

Here, θ is an angle between the optical axis and a line which connects the center in X direction between the first optical set 251 and the second optical set 252 to points in the illumination area 33.

Next, with reference to FIG. 14 through FIG. 18, examples of the biometric authentication sensor in which the illumination apparatus 100 is installed are described.

Figure 14:
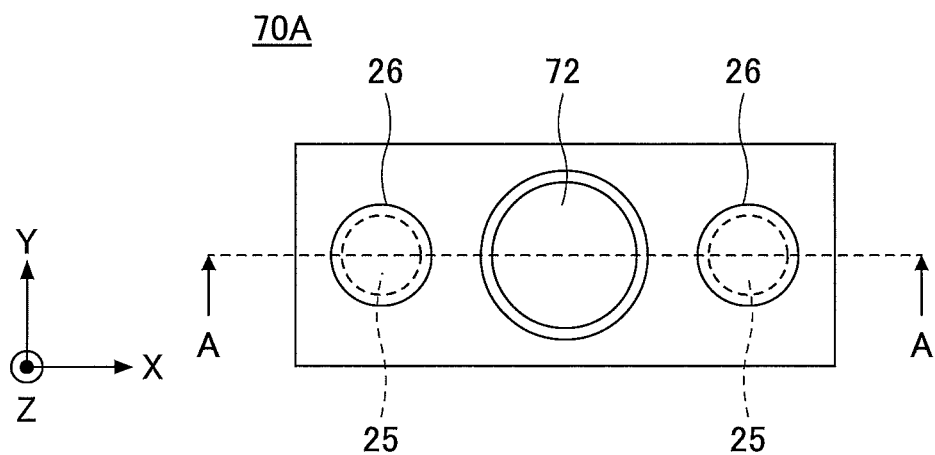
FIG. 14 is a top view schematically illustrating an example of the sensor for the biometric authentication apparatus installed in the illumination apparatus 100A.
Figure 15:
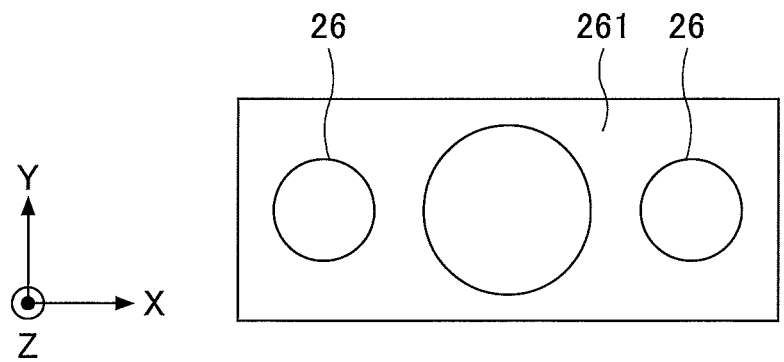
FIG. 15 is a top view schematically illustrating an example of a substrate 261 including the diffraction grating element 26.
Figure 16:
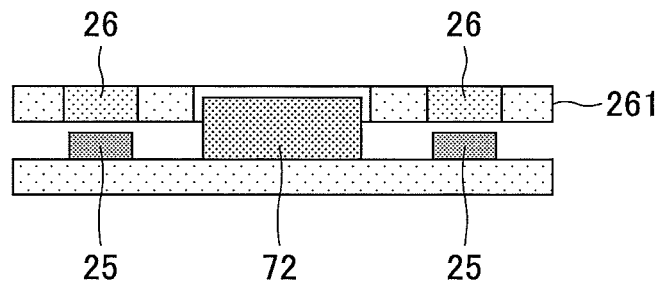
FIG. 16 is a diagram illustrating a cross-section view along a line A-A in FIG. 14.

FIG. 14 is a top view schematically illustrating an example of the biometric authentication sensor installed in the illumination apparatus 100. In FIG. 14, an example of the biometric authentication sensor in which the illumination apparatus 100 is installed is indicated by a reference numeral "70A". It is noted that in FIG. 14 an illustration of the illumination area 33 is omitted. FIG. 15 is a top view schematically illustrating an example of a substrate 261 including the diffraction grating element 26. FIG. 16 is a diagram for illustrating a cross-sectional view along a line A-A in FIG. 14.

The second switch part 70A includes an imaging optical system 72 such as a camera, two light sources 25, and two diffraction grating elements 26. The two light sources 25 are formed on the substrate 261, as illustrated in FIG. 15, for example. The diffraction grating elements 26 are provided on the light emitting surface sides of the light sources 25, respectively. The diffraction grating elements 26 are disposed symmetrically with respect to the optical axis of the imaging optical system 72. Pairs of the diffraction grating element and the light source 25 form the illumination apparatus 100, respectively.

It is noted that, in the example illustrated in FIG. 14 through FIG. 16, the diffraction grating elements 26 have the distribution characteristics of the grating intervals (see FIG. 5 and FIG. 8) according to the first embodiment described above, respectively. It is noted that if offsets between the optical axis of the light sources 25 and the diffraction grating elements 26 are substantially small, respectively, it can be regarded that the centers of the diffraction grating elements 26 are on the optical axes of the light sources 25, respectively. However, if there are substantially offsets in X direction between the optical axis of the light sources 25 and the diffraction grating elements 26, respectively, the diffraction grating elements 26 may have the distribution characteristics of the grating intervals in only Y direction according to the first embodiment described above, respectively. In this case, the distribution characteristics of the grating intervals in X direction may be ones related to a non-symmetrical arrangement described hereinafter (see FIG. 20).

Figure 17:
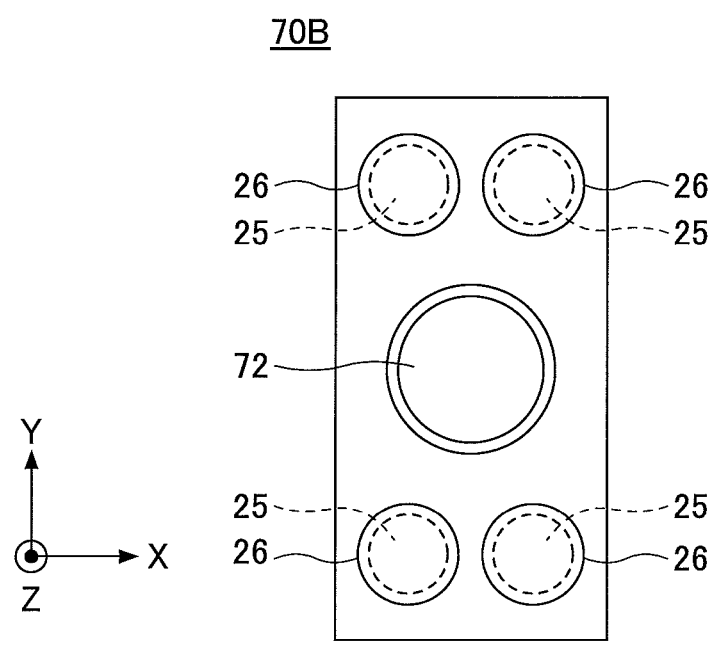
FIG. 17 is a top view schematically illustrating another example of the sensor for the biometric authentication apparatus installed in the illumination apparatus 100.
Figure 18:
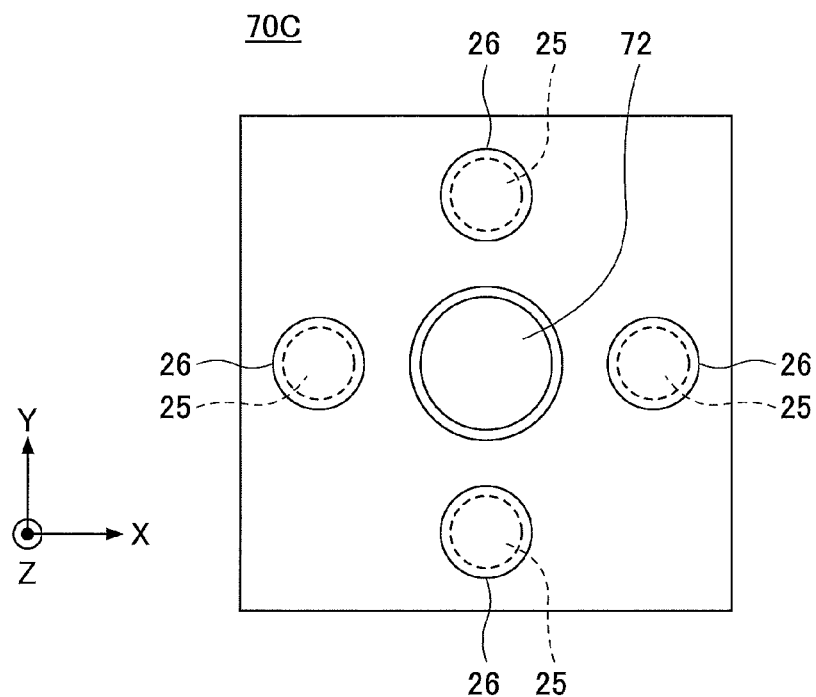
FIG. 18 is a top view schematically illustrating yet another example of the sensor for the biometric authentication apparatus installed in the illumination apparatus 100.

FIG. 17 is a top view schematically illustrating another example of the biometric authentication sensor installed in the illumination apparatus 100. In FIG. 17, an example of the biometric authentication sensor in which the illumination apparatus 100 is installed is indicated by a reference numeral "70B". FIG. 18 is a top view schematically illustrating yet another example of the biometric authentication sensor installed in the illumination apparatus 100. In FIG. 18, an example of the biometric authentication sensor in which the illumination apparatus 100 is installed is indicated by a reference numeral "70C". In the examples illustrated in FIG. 17 and FIG. 18, the diffraction grating elements 26 are disposed symmetrically with respect to the optical axis of the imaging optical system 72. Pairs of the diffraction grating element and the light source 25 form the illumination apparatus 100, respectively. In this way, the arbitrary number of the pairs of the diffraction grating element 26 and the light source 25 may be arranged in an arbitrary symmetrical manner with respect to the optical axis of the imaging optical system 72.

Figure 19:
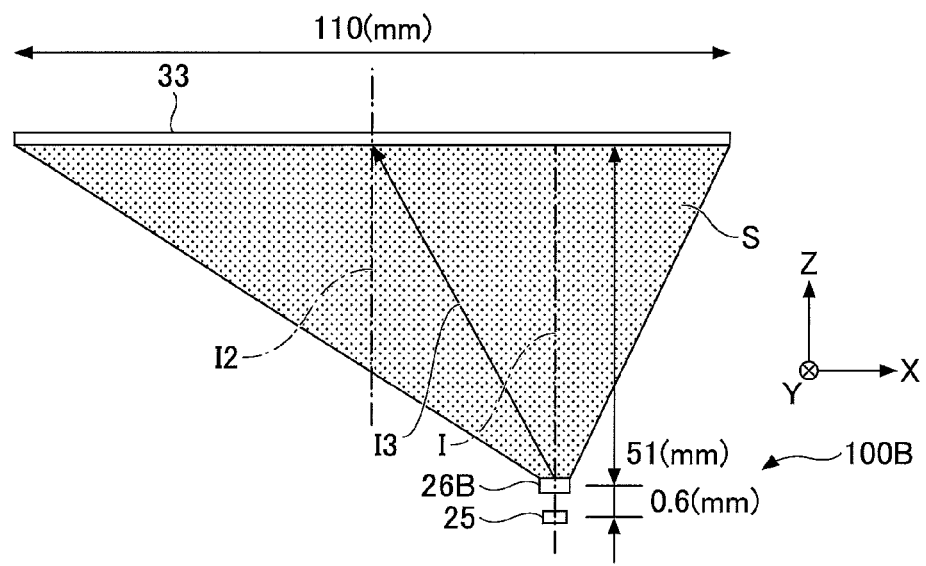
FIG. 19 is a diagram schematically illustrating an example of a cross-section of an illumination apparatus according to a third embodiment.
Figure 20:
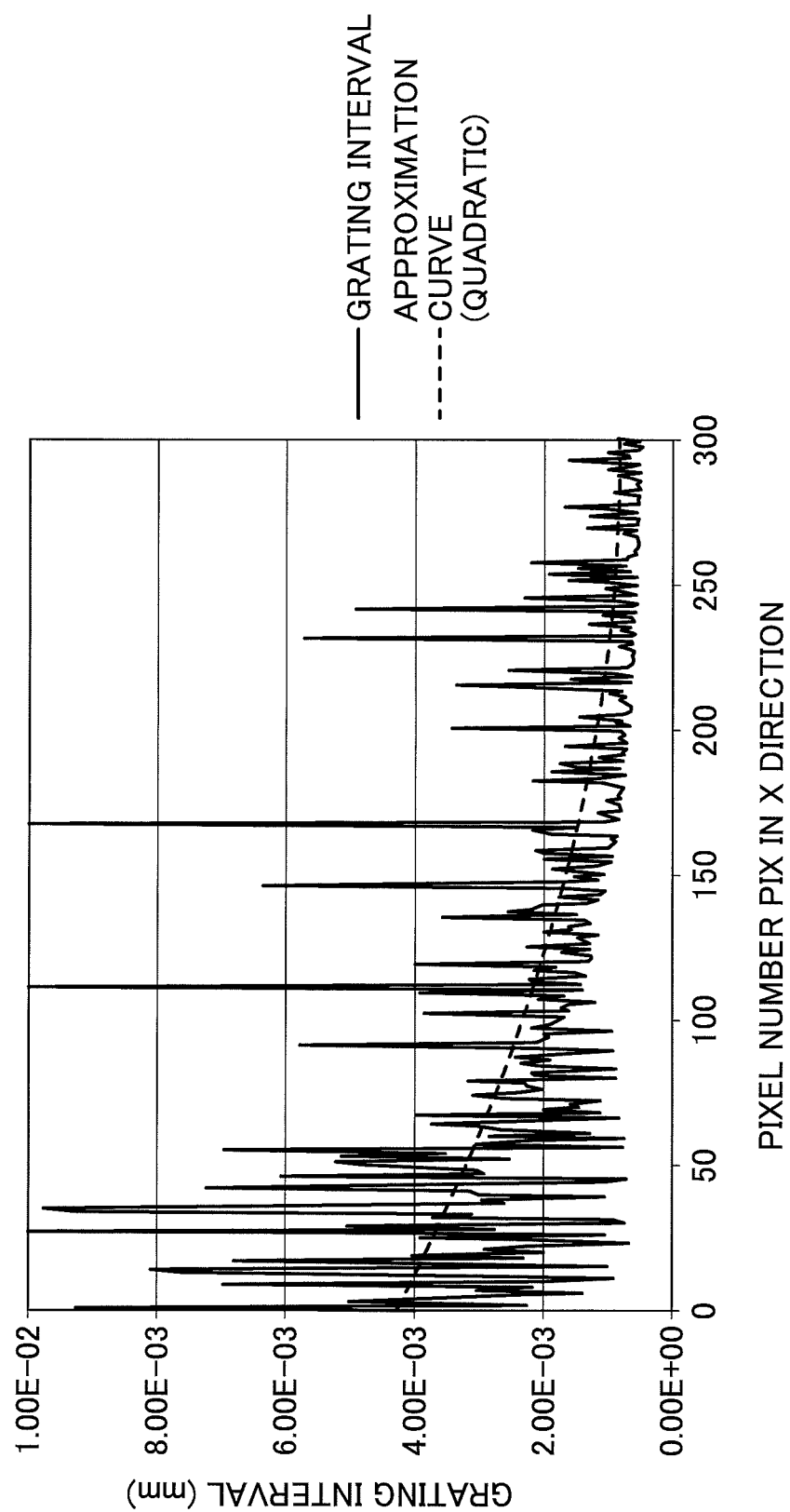
FIG. 20 is a diagram for illustrating an example of a distribution characteristic of grating intervals of a diffraction grating element 26B.
Figure 21:
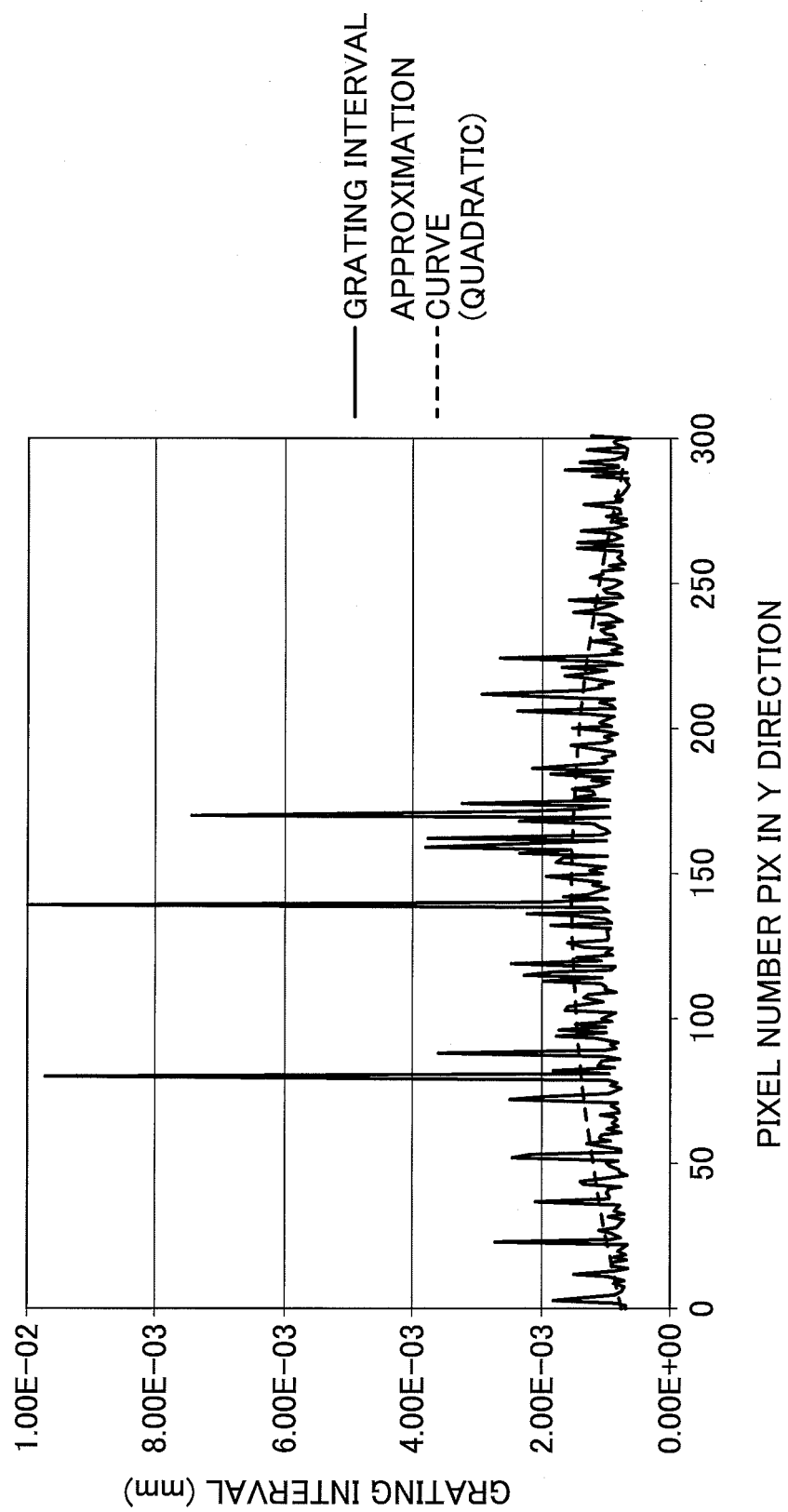
FIG. 21 is a diagram for illustrating an example of a distribution characteristic of grating intervals of a diffraction grating element 26B.

Next, with reference to FIG. 19 through FIG. 21, an illumination apparatus according to a third embodiment is described.

FIG. 19 is a diagram schematically illustrating an example of a cross-section of the illumination apparatus according to the second embodiment. In FIG. 19, an example of the illumination apparatus according to the third embodiment is indicated by a reference number "100B". In FIG. 3, spread light from a diffraction grating element 26B toward the illumination area 33 is schematically illustrated with a hatching region S.

The illumination apparatus 100B according to the third embodiment differs from the illumination apparatus 100 according to the first embodiment described above in that the optical axis I of the light source 25 and the optical axis of the diffraction grating element 26B are offset with respect to the optical axis I2 of the imaging optical system 72, and main light beam 13 emitted from the center of the diffraction grating element 26B is inclined. It is noted that elements which may be the same as the corresponding elements according to the first embodiment described above are given the same reference numerals and their explanation is omitted.

The illumination apparatus 100B includes the light source 25 and the diffraction grating element 26B.

The diffraction grating element 26B is provided between the illumination area 33 and the light source 25. The diffraction grating element 26B includes a unified body in which a plurality of diffraction gratings are arranged in a two dimensional array (see FIG. 4). The center of the plane of the two dimensional array of the diffraction grating element 26B is disposed on the optical axis of the light source 25. It is noted that the diffraction grating element 26B may be the same as the diffraction grating element 26 according to the first embodiment described above except for the distribution characteristic of the grating intervals along X direction as described hereinafter.

The center of the diffraction grating element 26B has a substantial offset in X direction with respect to the optical axis I2 of the imaging optical system 72 due to the fact that the optical axis I of the light source 25 has a substantial offset in X direction with respect to the optical axis I2 of the imaging optical system 72. The phase "having a substantial offset" means that the optical axis I2 of the imaging optical system 72 does not pass through the diffraction grating element 26B.

FIG. 20 is a diagram for illustrating an example of the distribution characteristic of the grating intervals of the diffraction grating element 26B. FIG. 20 illustrates the distribution characteristic of grating intervals of a plurality of diffraction gratings (300 diffraction gratings, in this example) along X direction. For example, the distribution characteristic of grating intervals along a line (an example of a predetermined line) of X direction through the center of the diffraction grating element 26B is illustrated in FIG. 20. However, the diffraction grating element 26B may have such a characteristic as illustrated in FIG. 20 along a line in X direction through an arbitrary position other than the center, or along a line in X direction through an arbitrary position in a particular range of Y direction.

FIG. 21 is a diagram for illustrating an example of the distribution characteristic of the grating intervals of the diffraction grating element 26B. FIG. 21 illustrates the distribution characteristic of grating intervals of a plurality of diffraction gratings (300 diffraction gratings, in this example) along Y direction. For example, the distribution characteristic of grating intervals along a line (an example of a predetermined line) of Y direction through the center of the diffraction grating element 26B is illustrated in FIG. 21. However, the diffraction grating element 26B may have such a characteristic as illustrated in FIG. 21 along a line in Y direction through an arbitrary position other than the center, or along a line in Y direction through an arbitrary position in a particular range of X direction.

In the example illustrated in FIG. 20 and FIG. 21, as an example, the characteristic, which is obtained from the diffraction grating element 26B whose dimensions are as follows, is illustrated. The diffraction grating element 26B has a rectangular shape of 3 mm×3 mm, the pixel number PIX of the diffraction grating element 26B is 300, and the cells 263 each have a rectangular shape of 0.01 mm×0.01 mm. In FIG. 20 and FIG. 21, lines connecting the grating intervals of the cells 263 along a line in X direction and a line in Y direction are indicated with solid lines, respectively. Further, in FIG. 20 and FIG. 21, an approximation curve of a polynomial (quadratic) for the respective values (plots) of the grating intervals of the cells 263 along a line in X direction and a line in Y direction are indicated with broken lines, respectively. It is noted that the order of the polynomial for the approximation curve is arbitrary.

According to the third embodiment, as illustrated in FIG. 20, the distribution of the grating intervals along the line in X direction has a characteristic such that the diffraction grating element 26B has the grating intervals gradually decreased from a first end thereof, closer to the optical axis I2 of the imaging optical system 72, to a second end thereof. In the example illustrated in FIG. 20, the distribution characteristic of the grating intervals along the line in X direction is such that the greater the pixel number PIX in X direction becomes, the smaller the grating interval becomes gradually.

Further, as illustrated in FIG. 21, according to the third embodiment, the distribution of the grating intervals along Y direction has a characteristic such that the grating interval in the center region is greater than that in the end region. For example, as illustrated in FIG. 21, the grating intervals at the pixel number PIX in Y direction between 125 and 175 are substantially greater than the grating intervals at the pixel number PIX in Y direction between 1 and 50 and between 250 and 300. It is noted that, in the example illustrated in FIG. 21, the distribution characteristic of the grating intervals is symmetrical with respect to the point at the pixel number PIX of 150 in Y direction; however, the distribution characteristic of the grating intervals may not be symmetrical.

According to the third embodiment, even when the center of the diffraction grating element 26B has the substantial offset with respect to the optical axis I2 of the imaging optical system 72 in X direction, it becomes possible to increase the uniformity in the distribution of the optical strength when the $0^{th}$ transmission light and the n-th diffracted light are combined, as is the case with the first embodiment described above.

It is noted that, according to the third embodiment, the center of the diffraction grating element 26B has the substantial offset with respect to the optical axis I2 of the imaging optical system 72 in X direction, but does not have substantial offset with respect to the optical axis I2 of the imaging optical system 72 in Y direction. However, the center of the diffraction grating element 26B may have the substantial offsets with respect to the optical axis I2 of the imaging optical system 72 in X direction and Y direction, respectively. In this case, the distribution characteristic of the grating intervals along Y direction may be such as illustrated in FIG. 20.

Next, with reference to FIG. 14 through FIG. 18, examples of the biometric authentication sensor in which the illumination apparatus 100B is installed are described.

Figure 22:
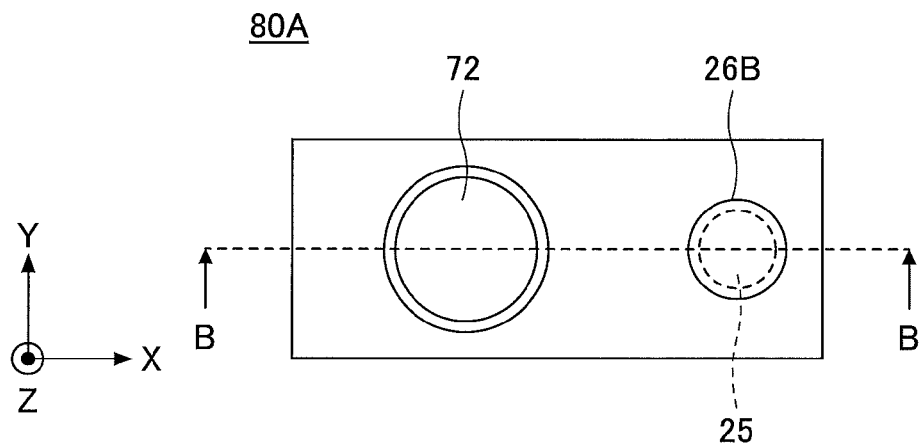
FIG. 22 is a top view schematically illustrating an example of the sensor for the biometric authentication apparatus installed in the illumination apparatus 100B.
Figure 23:
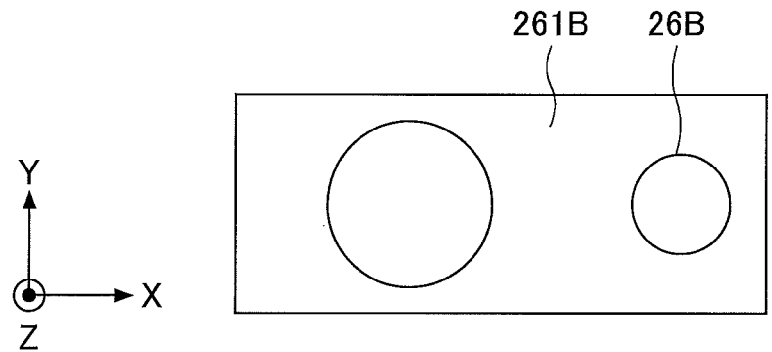
FIG. 23 is a top view schematically illustrating an example of a substrate 261B including the diffraction grating element 26B.
Figure 24:
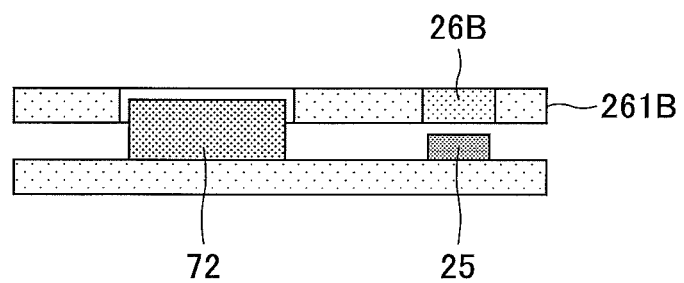
FIG. 24 is a diagram illustrating a cross-sectional view along a line B-B in FIG. 22.

FIG. 22 is a top view schematically illustrating an example of the biometric authentication sensor installed in the illumination apparatus 100B. In FIG. 22, an example of the biometric authentication sensor in which the illumination apparatus 100B is installed is indicated by a reference numeral "80A". It is noted that in FIG. 22 an illustration of the illumination area 33 is omitted. FIG. 23 is a top view schematically illustrating an example of a substrate 261B including the diffraction grating element 26B. FIG. 24 is a diagram illustrating a cross-section view along a line B-B in FIG. 22.

The biometric authentication sensor 80A includes an imaging optical system 72, a light source 25 and a diffraction grating element 26B. The diffraction grating element 26B is formed on the substrate 261B, as illustrated in FIG. 23, for example. The diffraction grating element 26B is provided on the light emitting surface side of the light source 25. The diffraction grating element 26 and the light source 25 form the illumination apparatus 100B. It is noted that, in the example illustrated in FIG. 22 through FIG. 24, the diffraction grating elements 26B have the distribution characteristics of the grating intervals (see FIG. 20 and FIG. 21) according to the third embodiment described above, respectively.

Figure 25:
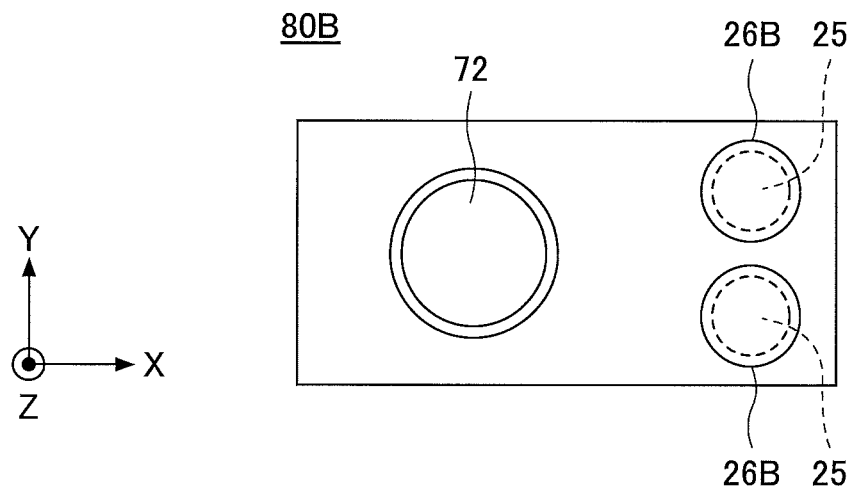
FIG. 25 is a top view schematically illustrating another example of the sensor for the biometric authentication apparatus installed in the illumination apparatus 100B.
Figure 26:
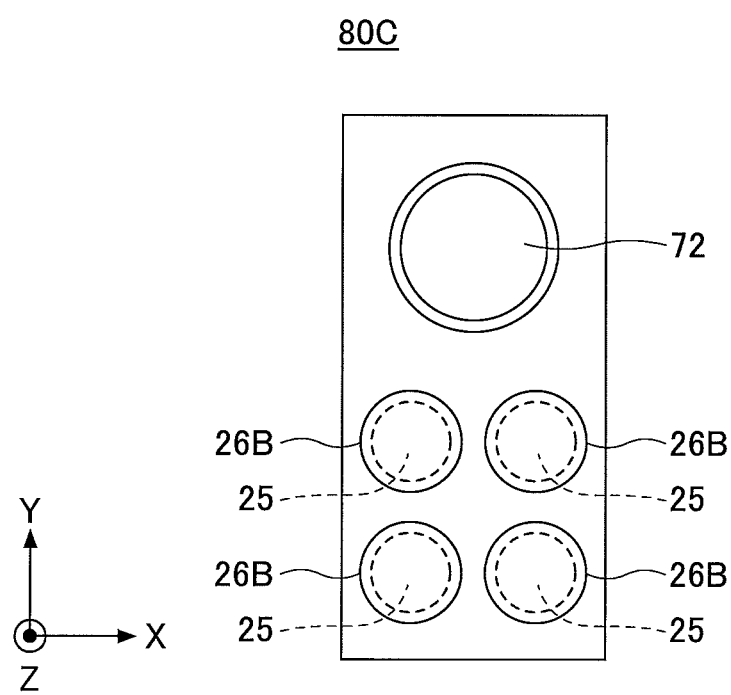
FIG. 26 is a top view schematically illustrating yet another example of the sensor for the biometric authentication apparatus installed in the illumination apparatus 100B.

FIG. 25 is a top view schematically illustrating another example of the biometric authentication sensor installed in the illumination apparatus 100B. In FIG. 25, an example of the biometric authentication sensor in which the illumination apparatus 100B is installed is indicated by a reference numeral "80B". FIG. 26 is a top view schematically illustrating yet another example of the biometric authentication sensor installed in the illumination apparatus 100B. In FIG. 26, an example of the biometric authentication sensor in which the illumination apparatus 100B is installed is indicated by a reference numeral "80C". In the examples illustrated in FIG. 25 and FIG. 26, the diffraction grating elements 26B are disposed symmetrically with respect to the optical axis of the imaging optical system 72. Pairs of the diffraction grating element 26B and the light source form the illumination apparatus 100B, respectively. In this way, arbitrary number of the pairs of the diffraction grating element 26B and the light source 25 may be arranged in an arbitrary non-symmetrical manner with respect to the optical axis of the imaging optical system 72.

Figure 27:
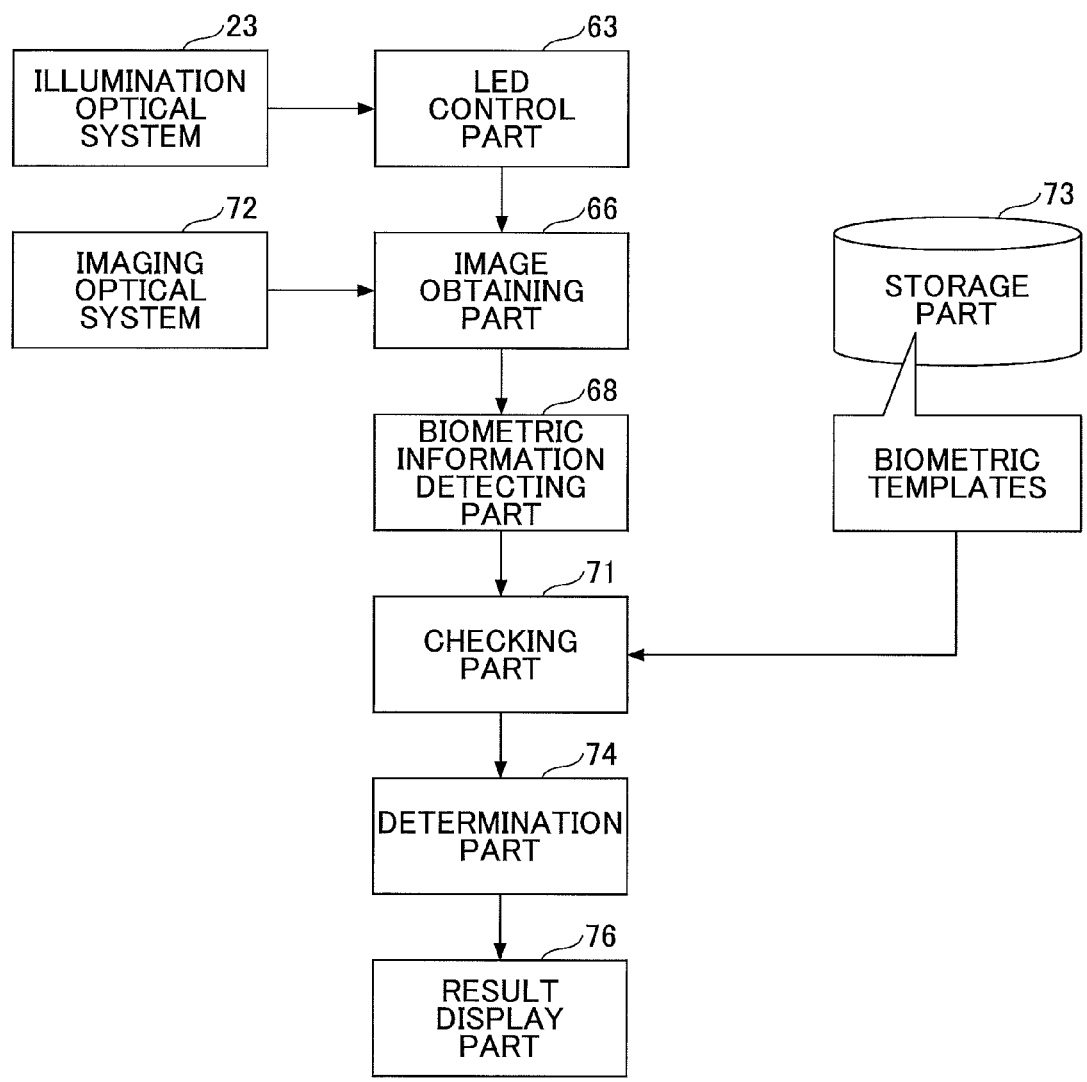
FIG. 27 is a block diagram illustrating an example of a biometric authentication apparatus.
Figure 28:
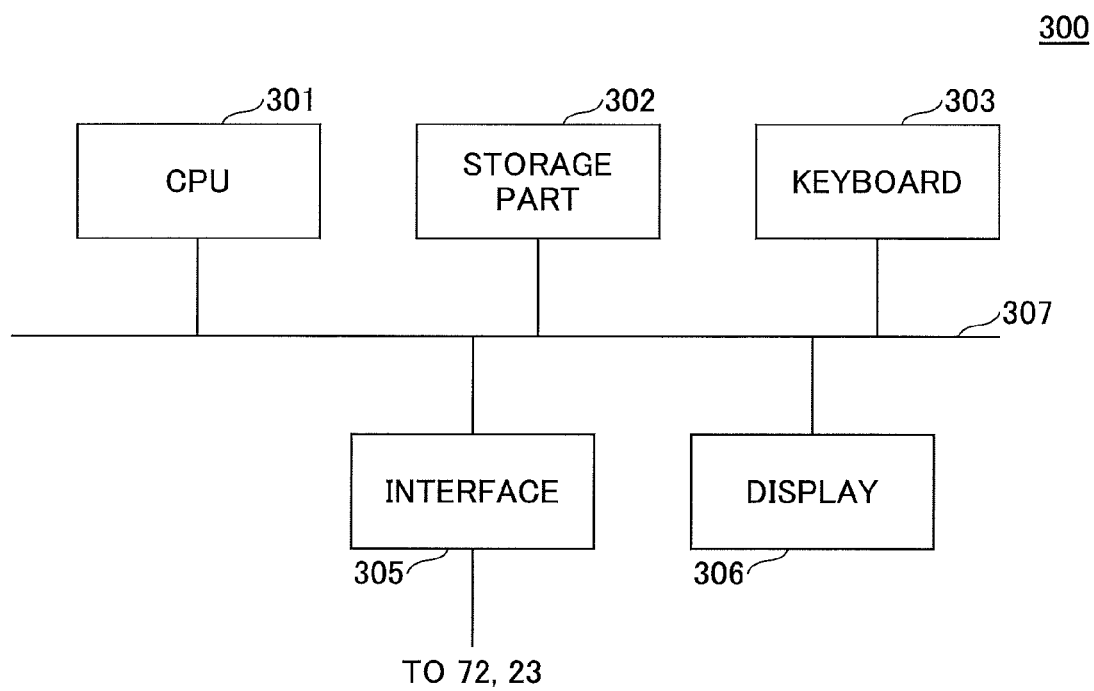
FIG. 28 is a block diagram illustrating an example of a configuration of a computer.

Next, with reference to FIG. 27 and FIG. 28, a biometric authentication apparatus according to an embodiment is described.

FIG. 27 is a block diagram illustrating an example of the biometric authentication apparatus. The biometric authentication apparatus 600 includes an illumination optical system 23, an imaging optical system 72, a LED control part 63, an image obtaining part 66, a biometric information detecting part 68, a checking part 71, a storing part 73, a determination part 74, and a result display part 76. Biometric templates which are prepared in advance are stored in storing part 73. The checking part 71 checks biometric information detected by the biometric information detecting part 68 against the biometric templates. The result display part 76 displays the check result of the checking part 71 or the biometric image.

The illumination optical system 23 includes the illumination apparatus 100. However, the illumination optical system 23 may include the illumination apparatus 100A or 100B. Further, the illumination optical system 23 and the imaging optical system 72 may include any one of the biometric authentication sensors 70A through 70C, 80A through 80C described above.

When a user put a palm of his/her hand, which is an example of a living body, on the illumination area 33, the biometric authentication apparatus 600 detects the object to be authenticated, which causes the LED control part 63 to turn on the light source 25 of the illumination optical system 23. As a result of this, the light source 25 emits the light to the illumination area 33 via the diffraction grating element 26. The imaging optical system 72 captures the living body (the palm of the hand, in this example) on the illumination area 33, and the image obtaining part 66 obtains the captured input image. The biometric information detecting part 68 detects the biometric information unique to the user based on the input image. The checking part 71 checks the detected biometric information against the biometric templates stored in the storing part 73. The determination part 74 determines, based on the check result, whether the user is an authorized user. The result display part 76 displays the check result of the checking part 71 or the determination result of the determination part 74 on a display. For example, the result display part 76 displays a message of the check result as to whether the detected biometric information matches the biometric template, etc., on the display. The result display part 76 is an example of an output part that outputs the check result of the checking part 71. The output part that outputs the check result is not limited to the result display part 76 that displays the check result. For example, the output part may include a voice synthesizer that outputs the check result with voice sound, for example. Further, the determination part 74 may be omitted, and the function of the determination part 74 may be implemented by the checking part 71.

FIG. 28 is a block diagram illustrating an example of a configuration of a computer. The biometric authentication apparatus 600 illustrated in FIG. 27 may be implemented by the computer 300 illustrated in FIG. 28. The computer 300 illustrated in FIG. 28 may be a general-purpose computer such as a personal computer, for example. The computer 300 may have a CPU 301, a storage part 302, a keyboard 303 which is an example of an input part, an interface 305, and a display 306 which is an example of an output part. In this example, the CPU 301, the storage part 302, the keyboard 303, the interface 305, and the display 306 are connected to each other via a bus 307; however, a configuration of the computer 300 is not limited to the configuration in which they are connected via the bus 307. The imaging optical system 72 and the illumination optical system 23 are connected to the interface 305, for example.

The storage part 302 stores programs to be executed by the CPU 301 and items of data including the biometric templates, etc. The storage part 302 may include a HDD (Hard Disk Drive), etc. The CPU 301 executes the programs stored in the storage part 302 to control the computer 300 as a whole. All of or a part of the functions of the LED control part 63, the image obtaining part 66, the biometric information detecting part 68, the checking part 71, the storing part 73, the determination part 74, and the result display part 76 can be implemented by the CPU 301, when the CPU 301 executes the programs. For example, the CPU 301 can implement the function of the checking part 71 by executing the program. The storage part 302 also implements the function of the storing part 73.

The keyboard 303 is used to input commands and data to the CPU 301. The interface 305 is used to connect the computer 300 to an external device. The display 306 displays, under the control of the CPU 301, items of data for the user of the computer 300 (or an operator). The items of data the display 306 displays may include the input image, the message of the check result, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiments described above, the biometric authentication is not limited to the venous pattern of the palm of the hand. The biometric authentication may be implemented based on other biometric information such as the venous pattern of the finger, patterns of fingerprints or palms, patterns of iris, features of a face, etc.

Further, in the second embodiment described above, instead of the diffraction grating element 26, the diffraction grating element 26' or the diffraction grating element 26B may be used.

What is claimed is:

1. An illumination apparatus comprising:
   a light source configured to generate light for an illumination area to be illuminated; and
   a diffraction grating element provided between the illumination area and the light source, and including a plurality of diffraction gratings arranged in a two dimensional array, wherein
   a distribution of grating intervals of the diffraction gratings in the diffraction grating element has a characteristic such that a center region, along a predetermined line in a plane of the two dimensional array, has a greater grating interval than an end region.

2. The illumination apparatus of claim 1, wherein the diffraction grating element and the light source are disposed such that the plane of the two dimensional array is perpendicular to an optical axis of the light source and the optical axis passes through a center of the diffraction grating element, and
   the optical axis of the light source passes through a center of the illumination area.

3. The illumination apparatus of claim 1, wherein the predetermined line includes two lines passing through the center of the diffraction grating element, the two lines being perpendicular to each other.

4. The illumination apparatus of claim 1, wherein an approximation curve for the distribution of grating intervals along the predetermined line has the characteristic.

5. The illumination apparatus of claim 4, wherein the approximation curve has a peak value at a position corresponding to the center of the diffraction grating element.

6. The illumination apparatus of claim 4, wherein the diffraction grating element is disposed with respect to the illumination area in such a relationship that a line, which passes through a center of the illumination area and is parallel to an optical axis of the light source, passes through the diffraction grating element, and
   the approximation curve has a peak value at a position corresponding to the center of the illumination area.

7. The illumination apparatus of claim 1, wherein the diffraction grating element includes the diffraction gratings with different grating intervals and rotation directions.

8. The illumination apparatus of claim 7, wherein the different grating intervals and the rotation directions are set such that a distribution of optical strength over the illumination area, by 0th order transmission light and plus/minus $1^{st}$ order transmission light is more uniform than that by only the $1^{st}$ order transmission light.

9. The illumination apparatus of claim 1, wherein a plurality of the illumination apparatuses are provided for the illumination area, and
   intervals between the illumination apparatuses are set such that a distribution of optical strength over the illumination area is uniform or spherical.

10. A biometric authentication apparatus comprising:
    the illumination apparatus of claim 1; and
    an authentication part configured to perform a biometric authentication based on the image captured by the imaging optical system.

11. The biometric authentication apparatus of claim 10, wherein the diffraction grating element and the light source are disposed such that the plane of the two dimensional array is perpendicular to an optical axis of the light source and the optical axis passes through a center of the diffraction grating element.

12. A sensor for a biometric authentication apparatus, the sensor comprising:
    the illumination apparatus of claim 1; and
    an imaging optical system configured to capture an image of the illumination area.

13. An illumination apparatus comprising:
    a light source configured to generate light for an illumination area to be illuminated; and
    a diffraction grating element provided between the illumination area and the light source, and including a plurality of diffraction gratings arranged in a two dimensional array, wherein
    an optical axis of the light source is offset in a direction of a predetermined line with respect to a center of the illumination area, and
    a distribution of grating intervals of the diffraction gratings in the diffraction grating element has a characteristic such that the diffraction grating element has the grating intervals gradually decreased from a first end thereof, closer to the center of the illumination area, to a second end thereof, along the predetermined line in a plane of the two dimensional array.

14. The illumination apparatus of claim 13, wherein the diffraction grating element and the light source are disposed such that the plane of the two dimensional array is perpendicular to an optical axis of the light source and the optical axis passes through a center of the diffraction grating element.

15. The illumination apparatus of claim 13, wherein an approximation curve for the distribution of grating intervals along the predetermined line has a peak thereof at a position corresponding to an end of the illumination area.

16. A biometric authentication apparatus comprising:
    the illumination apparatus of claim 13; and
    an authentication part configured to perform a biometric authentication based on the image captured by the imaging optical system.

17. The biometric authentication apparatus of claim 16, wherein the diffraction grating element and the light source are disposed such that the plane of the two dimensional array is perpendicular to an optical axis of the light source and the optical axis passes through a center of the diffraction grating element.

18. A sensor for a biometric authentication apparatus, the sensor comprising:
    the illumination apparatus of claim 13; and
    an imaging optical system configured to capture an image of the illumination area.

* * * * *